United States Patent [19]
Keithley et al.

[11] Patent Number: 5,584,025
[45] Date of Patent: Dec. 10, 1996

[54] APPARATUS AND METHOD FOR INTERACTIVE COMMUNICATION FOR TRACKING AND VIEWING DATA

[75] Inventors: Ronald D. Keithley, Charlottesville; Kevin L. Keithley, Earlysville, both of Va.

[73] Assignee: The Real Estate Network, Charlottesville, Va.

[21] Appl. No.: 420,701

[22] Filed: Apr. 12, 1995

Related U.S. Application Data

[63] Continuation of Ser. No. 145,399, Oct. 29, 1993, abandoned.

[51] Int. Cl.$^6$ .................................................. G06F 17/40
[52] U.S. Cl. ........................................ 395/615; 364/225.4
[58] Field of Search .................................. 395/600, 161; 364/401, 408

[56] References Cited

U.S. PATENT DOCUMENTS

| | | | |
|---|---|---|---|
| 4,429,385 | 1/1984 | Cichelli et al. | 370/92 |
| 4,689,478 | 8/1987 | Hale et al. | 235/380 |
| 4,799,156 | 1/1989 | Shavit et al. | 364/401 |
| 5,032,989 | 7/1991 | Tornetta | 364/401 |
| 5,191,410 | 3/1993 | McCalley et al. | 358/86 |
| 5,235,680 | 8/1993 | Bijnagte | 395/161 |
| 5,237,157 | 8/1993 | Kaplan | 235/375 |
| 5,237,498 | 8/1993 | Tenma et al. | 364/406 |
| 5,369,571 | 11/1994 | Melts | 364/401 |

*Primary Examiner*—Robert B. Harrell
*Assistant Examiner*—Viet Vu
*Attorney, Agent, or Firm*—Sheldon H. Parker

[57] ABSTRACT

An information processing system for acquiring and displaying information relating to a specific industry or interest, the example herein being real estate and related goods and services. The system comprises a server which has an input/output device for receiving and transmitting data, database files, and database storage. A media terminal for producing files, including digitized property descriptions, is provided. The media terminal has a digitizer for analog/digital signal converting, an i/o device for transmitting, and a data entry device. An end user terminal provides the ability to enter, transmit, receive and display data to and from the file server. An agent's terminal is equipped to enter and display data, as well as transmit information to and from the file server. The system is configured such that real estate information is received at the media terminal, edited, and, once approved, stored at the file server. The information is accessible from either the agent's or end user's terminals. The compilation of information in the databases includes demographic statistics which are usable by Advertisers and various industry related entities.

9 Claims, 9 Drawing Sheets

APPARATUS AND METHOD FOR INTERACTIVE COMMUNICATION FOR TRACKING AND VIEWING DATA

This is a continuation of application Ser. No. 08/145,399 filed on 10/29/93 now abandoned.

BACKGROUND OF THE INVENTION

Brief Description of the Invention

The instant invention relates to a method of accessing industry specific information, such as real estate properties for sale, through multimedia personal computers. The disclosed invention includes an interactive multimedia communications system for the production, digitization, compression and decompression, transmission, and retrieval of real property data and related information. The access provides detailed information on a particular property, community, financing, demographics, and related information. The information can be accessed on demand by Real Estate Agents as well as by End Users wherever their multimedia device is located. The instant system presents a new advertising medium for industry-specific advertisers or even general advertisers as the case may be. The instant system is a response-driven, full service, real-time advertising medium capable of generating direct response vehicles (i.e., coupons, reply and order mechanisms, etc.) to viewers. For illustrative purposes, the real estate industry is used as an example herein, however, the disclosed system can be used for other applications, i.e., travel, employment opportunities, auctions, antique or rare articles for sale, automobiles, boats, aircraft, etc. Because each property profile and advertisement regardless of sponsor has its own identification code and each user of the disclosed system has their own access code, the instant invention provides detailed data on all aspects of viewership and response. When, where, and how often an advertisement and/or profile is viewed is instantly recorded by the disclosed system. The instant invention is a measurable advertising medium which measures advertising in terms of exposure, response, and level of interest. Viewership and response patterns can be retrieved by advertisers, agents, and subscribers via the disclosed system's demographic retrieval databases.

BRIEF DESCRIPTION OF THE PRIOR ART

Each year large numbers of the population move, requiring property purchasing, leasing, selling and related services. In the residential market, real estate agents and homeowners selling their own properties spend considerable time matching seller to buyer and vice-versa. In the agent's case, buyers review property listings from a Multiple Listing Service at the agent's office, making judgments based on photographs and limited information. The details are generally on a single sheet at best, and include the number of rooms, occasionally size of rooms, number of bathrooms, land size, and any out-buildings such as barns. The properties chosen for review must then be physically shown, so Real Estate Agents then drive potential buyers around showing properties, which wastes both time and money. Potential purchasers often need to take time off from work and spend many hours riding around looking at properties. The prior art system is, at best, time consuming and inefficient. Everyone involved in the house hunt must be prepared to devote a substantial amount of time to viewing properties.

On the other side of the transaction, sellers often have potential buyers looking at their homes who are not interested in making a purchase or worse yet, not financially qualified. Frequently a property is inaccessible when a potential purchaser wants to view it or a "no-show" occurs after the agent and/or seller went to considerable time and effort to present the property. Likewise, the agent and seller have a significant investment of time, effort and money at stake if the buyer fails to qualify for financing or the closing doesn't occur as scheduled.

The commercial real estate market is almost identical to the residential market in regard to how properties are reviewed and chosen. One primary difference is, however, the due diligence performed by both users and investors of commercial real estate. Typically, users and real estate investors will seek the financial data on a property prior to even physically seeing it. Extensive information regarding comparable rents, vacancy rates, and similar properties is often the norm. Obtaining this information is often difficult and once received, it is limited in scope. In addition, landlords typically dislike disturbing existing tenants with the showing of their property to a potential purchaser or new tenant.

At present, real estate agents from around the United States employ various forms of a property listing system often referred to as the Multiple Listing Service (MLS). These systems are usually not accessible by agents outside the local system and provide little information on properties elsewhere or any network for referrals. In addition, any type of market data generated by the MLS is local in nature and cannot be easily translated into state, regional, or national trends. In most instances the current listing system provides small opportunity for an agent to handle the sale of a client's property and the purchase of a new property for the same client unless the move is local.

The majority of real estate advertising today is through local newspapers and trade publications. These advertisements are limited to space and production deadlines and readership is certainly hoped for, but in nearly every case unaccounted for. If changes in price, terms, or availability occur, the new information is restricted to production deadlines and such. In short, the traditional advertising mediums used for real estate advertising are usually non-measurable, limited in choice, fairly expensive and often non-exclusive in nature.

Another major marketing tool employed by both agents and sellers alike is "open houses." Due to access, convenience, and work schedules, "open houses" have been confined to weekends and predominately Sunday afternoons. The "open house" continues to be a valuable marketing tool but is limited to time constraints.

Often real estate agents are restricted for ethical and/or legal reasons from informing clients about local schools, churches and civic organizations. As a result, newcomers to an area have to investigate these facilities themselves and often under the pressure of time and convenience.

Illiquidity in the real estate marketplace often creates transactions wherein the seller will finance all or a portion of the purchase price. While presently, there are numerous entities that purchase these notes, there is no common medium for note-holders to advertise these security instruments for sale or exchange. Likewise, no medium exists which compiles data on these instruments.

Traditionally, the real estate industry has faced illiquidity, high capitalization (and the costs thereof), and cyclical trends. The "boom" decade of the 80's created an abundance of real estate and agents who market it. The current recession has produced a large correction in real estate prices which brings an already over supply of agents chasing fewer closings and smaller commissions. Having already noted the cyclical nature of the real estate industry, it still is important to realize that most agents even in good times or bad don't get both sides of a transaction. In other words, the sale of their client's current home and the purchase of their new property. Bridging this inefficiency as well as the others covered herein would yield greater productivity in the real estate marketplace and better use of personnel.

Therefore, the desire of all parties is a cost effective, efficient, and convenient means of retrieving detailed property information. With the system of the current application, consumers can view real property advertisements including digitized pictorial graphics and audio information, mortgage qualification programs and guidelines, mortgage rates, and different community profiles at their convenience and in the comfort of their own homes through use of the instant system. Once the End Users have narrowed down their choices, they meet with a Real Estate Agent at his or her office and access the Real Estate Agent's exclusive system. The Real Estate Agent's system details more about the property such as the Seller's name, property address, and listing agent information. In essence, anyone involved in a real estate transaction can readily retrieve and view all types of properties and related goods and services without the inefficiencies of the prior art system.

SUMMARY OF THE INVENTION

The instant invention is directed at an information processing system for acquiring and displaying real estate and industry related information. The system includes a Server having an i/o (input/output device) through which data is received and transmitted, and database storage for storing digital real estate information. Preferably the database storage includes the capability of storing scanned graphic images, video, and sound, as well as standard data.

The system further includes media terminals for production of files, including digitized property descriptions. The media terminal has digitizing capabilities to digitize analog input and i/o for receiving and transmitting the digitized information.

End users enter requests and receive the requested information, including property descriptions, at the End User terminal. The end user terminal has means for inputting and displaying data, such as a cable television converter, and a microcomputer (for decompression, storage, and error correction), and either an internal or external i/o for receiving and transmitting data.

The Real Estate Agent terminals are used for entering and receiving information and are equipped with a means for inputting and displaying data and i/o for receiving and transmitting data.

The i/o of the system components are configured to communicate between the Media, End User, Real Estate Agent and Demographic Information Subscriber and Server. Digitized real estate information, consisting of property descriptions, is received by the Server from all input sources via the i/o of the media terminal. The received digital real estate information is then stored in the Server's database. Viewer selected portions of digital real estate information are transmitted to the end user terminal, where they are displayed for viewing.

The Media, End User, Real Estate Agent and Demographic Subscriber terminals have compression/decompression capabilities for file storage and/or transmission. Also, optionally and preferably, the Server stores information regarding property profiles, real estate professionals, community profiles, real estate financing, local businesses and services, and demographic retrievals, all of which can be received and displayed by the viewer. The instant system is configured to prevent access to certain real estate information, but configured to make that same information available to other users.

The instant invention is a method of acquiring and displaying real estate information, the system utilizes an information processing system containing a Server with i/o for receiving and providing data and database storage. Analog property descriptions of real estate properties are digitized and entered along with additional information, and edited at terminals. The proofed information is stored in the database in a manner in which the data can be selectively accessed. The End User enters data at their terminal specific to their real estate needs or services. This data is then sent to the Server, where the property profiles are selected and sent to the End User. Real Estate Agents can access the Server's databases through entry at their terminals and retrieve information. The system has the ability to access and transmit selected files, depending upon the requests of the user. In all cases, viewer selections are captured and stored by the Server.

BRIEF DESCRIPTION OF THE DRAWINGS

The advantages of the instant disclosure will become more apparent when read with the specifications and the drawings, wherein.

DETAILED DESCRIPTION OF THE INVENTION

Figure 1:
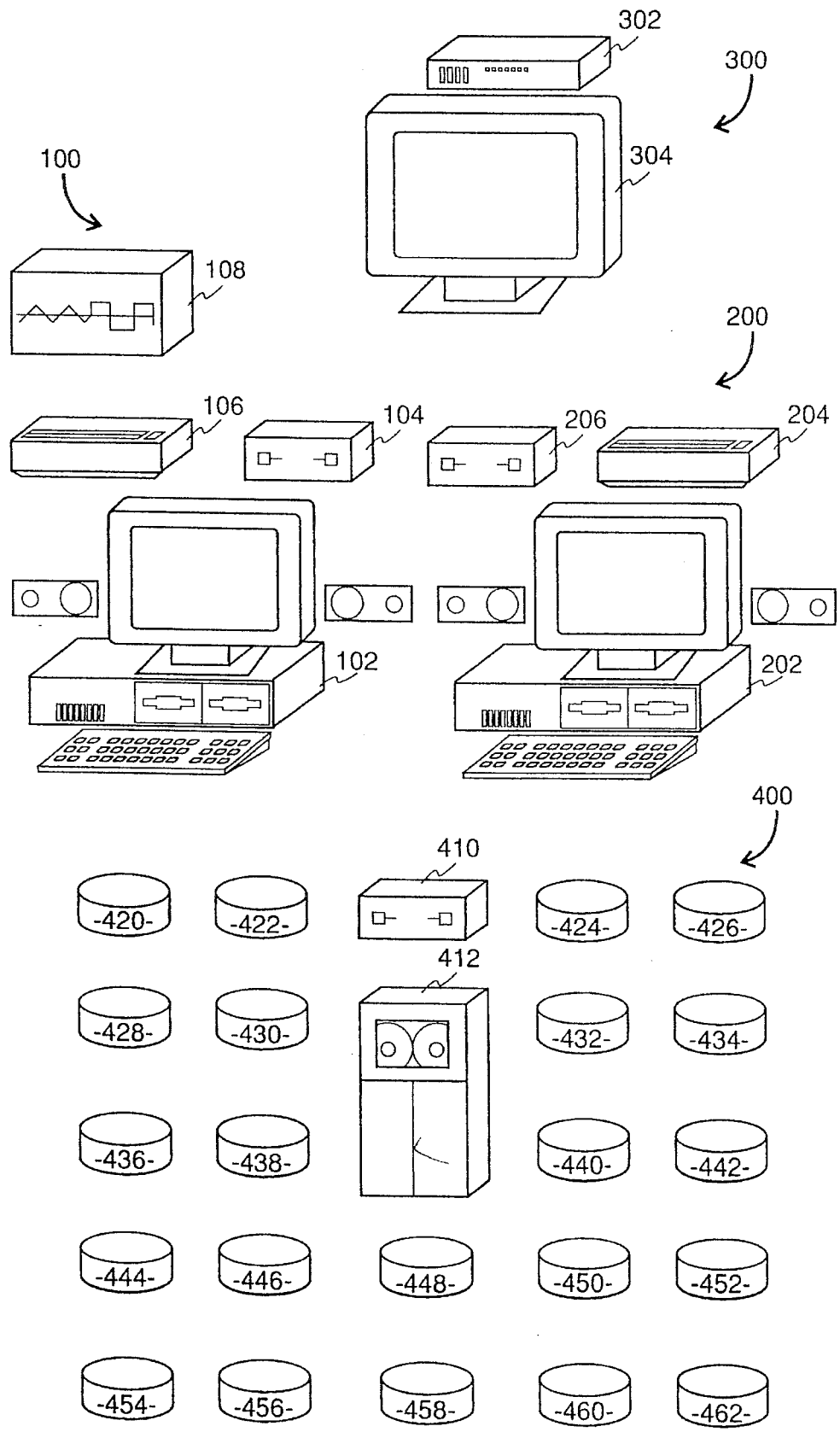
FIG. 1 is a schematic of the major components according to the present invention.

The instant invention discloses a network system which allows the users to interactively access and retrieve on demand extensive information on databases throughout the world regardless of time zone differences. The application of the instant disclosure described herein applies to the Real Estate Industry, however the disclosed system can be used for other applications. For use within this disclosure, the following terminology is used for consistency and should in no way limit the scope of the invention.

End User—The party viewing the database files. Typically an End User of real estate looking to lease and/or purchase real property. The End User generally has access to only limited files and can optionally have input capability to alter the files they are viewing. The End User can include viewers seeking ideas for home building, decorating or remodeling. In addition, relocation companies or departments in corporations, architects, etc., are also included.

Real Estate Companies and Agents—The sales agent or facilitator of a real estate transaction and the primary user of the instant system. The Real Estate Agent has access to the instant system regardless of where the system is accessed.

Media—The primary party responsible for production of property files and possibly all other advertising displayed on the system. The Media has access to all files on the Server and, alternatively, may be part of the Server's system. The Media can include multimedia communications, conglomerates, or local media entities.

Server—The computer system which stores all files. Input facilities for raw data may be located at the Server's location.

Multimedia device—A device and/or system which includes, but is not limited to, video and audio-graphic conferencing and multimedia messaging with electronic and voice mail system so specifications and other text-based material and voice communications can occur rapidly and without time zone interference. This unit is capable of storing, transmitting, receiving, compressing, decompressing and error correcting, digital information for displaying text, graphics, audio and video.

Advertiser—An entity promoting goods and/or services related to a specific industry. The advertising can be directed to any of the users in the instant system and direct response vehicles (i.e., coupons, reply and order mechanisms, etc.) are made available to viewers.

Demographic Information Subscriber—The recipient of demographic information which is generated by the instant system. Throughout the instant invention certain portions of demographic information can remain proprietary, but the demographic flow of the populace is available to Subscribers and industry-related advertisers.

It should be noted that a company or individual can fall into two or more of the foregoing categories. A moving company, for example, can be an Industry Related Advertiser and also a Subscriber retrieving demographic information for marketing purposes. In another example, an architect could be an advertiser of their services and, at the same time, be an End User accessing the disclosed system to monitor design trends, new housing developments, and competitive practices.

FIG. 1 is an overview of the major system components which would be required to complete the disclosed system. The media's multimedia device 100 would preferably consist of a digitizer 108, compress/decompress unit 106, modem 104, and multimedia PC 102. The real estate agent's multimedia device 200 would preferably comprise the multimedia PC 202, the modem 206 and the compress/decompress unit 204. The End User's, or Subscriber's, multimedia device 300 preferably consists of a multimedia unit 302 and a viewing device 304. The viewing device 304 can be the End User's television, a monitor, or other apparatus which allows for multimedia viewing. The multimedia unit 302 can be a computer system or a cable television converter with a microprocessor or other technology which provides for compression or decompression, error correcting, transmission, and storage. Alternatively, the multimedia unit 302 can be made part of the End User's viewing device 304. The Server's Processor, or unit 400, preferably comprises a modem 410, a Server's computer 412 and databases 420, 422, 424, 426, 428, 430, 432, 434, 436, 438, 440, 442, 444, 446, 448, 450, 452, 454, 456, 458, 460, and 462. The Server's computer 412 alternatively can be a workstation, minicomputer or microcomputer or other device. Although reference herein is made to information transfer via modem, it should be noted that cable, satellite, fiber optics, or other means for transferring information can also be utilized. The method of transferring the information is based on the current availability within the communities.

In the drawings herein the Server's computer 412 is at a separate location from the media's multimedia device 100, and all communication is conducted through the use of modems 104, 206, and 410. Alternatively, the Server's computer 412 can be included in the same location as the media's multimedia device 100 with a hardwire link up between the two. If the Server's Processor 400 is not hardwired to the media's multimedia device 100, means for directly entering information into the Server's computer 412 other than through media's multimedia device 100 may be desired. This can be through an additional PC wired to the Server's computer 412, scanner, personal digital assistant, or any other method known in the art.

The For Sale By Owner (FSBO) Property Profiles Database 420 could include any type of real property offerings marketed by owners. The Auction Property Profiles Database 422 could include any type of real property offerings marketed via auctions. The Agent Property Profiles Database 424 could include any type of real property offerings marketed by real estate agents. The Agent Referral Database 426 could include any real estate agents and their companies who market property via the disclosed system. The Transaction Processing Database 428 generates and confirms appointments and significant dates for all parties involved in a real estate transaction. This same database contains a general accounting file for Real Estate Companies which can be exported to their primary accounting program. The Agent Leads Database 430 is a compilation of inquiries generated when an End User or other interested party views a particular property profile the Agent has advertised/listed on the disclosed system. The Agent Market Data Database 432 is a compilation of files such as inventory reports, sales-to-date, expired listings and contracts pending. The Government and Civic Organizations Database 434 is a compilation of government and civic organizations on a local, state, regional, and national basis that the viewer can access to obtain information on particular issues such as zoning laws or involvement in a civic organization. The Community Profiles Database 436 contains video vignettes on communities where properties are available for purchase, lease, or exchange. The Events and Attractions Database 438 could have files such as Arts & Entertainment, Annual Events, Sports, and Special Attractions. The Educational Facilities Database 440 could consist of public, private, and trade schools, as well as colleges and libraries. The Real Estate Related Services Database 442 could comprise the following files: real estate companies, real estate agents, banks, mortgage companies, attorneys, insurance companies, moving companies, home inspectors, builders, property management, appraisers, architects, title companies, and any other type of real estate related service. The Home Services Database 444 is a compilation of files such as decorators, furniture and antique dealers, appliance dealers, building supply centers, remodeling services, home security services, and any other type of home service business or entity. The Restaurants and Lodging Database 446 could consist of hotel and motel files or bed and breakfast files as well as restaurant files. The Mortgage Programs Database 448 is a compilation of all available mortgage programs such as conventional, fixed, or adjustable rate mortgage programs. The Personal Mortgage Analysis Database 450 is a compilation of information derived from viewer input in regard to financing the purchase of any of the properties viewed. The Mortgage Rates Database 452 is a compilation of various mortgage rates offered by lenders on a local, state, regional, or national basis. The Real Estate Notes Database 454 is a compilation of real estate backed notes and securities offered for sale, servicing, or exchange on a local, state, regional, or national basis. The Property Inquiry Database 456 consists of all qualitative inquiries generated by viewers seeking more information on specific property profiles viewed on the disclosed system. The Property Retrieval Database 458 is generated by viewership of any property profiles wherein the viewer may or may not be interested in pursuing the transaction but has viewed the property. The Advertising Inquiries Database 460 comprises all qualitative inquiries generated by viewers seeking more information on specific goods or services advertised on the disclosed invention. The Advertiser Retrieval Database 462 is generated by viewership of any advertising message wherein the viewer may or may not be interested in obtaining more information about the advertiser's goods and/or services. All files are stored on their respective databases, providing easy access and manipulation. The databases are continually updated to ensure accurate, up-to-date information at all times. The foregoing files and databases are used as examples only, and should not in any way limit the scope of the instant disclosure.

Figure 2:
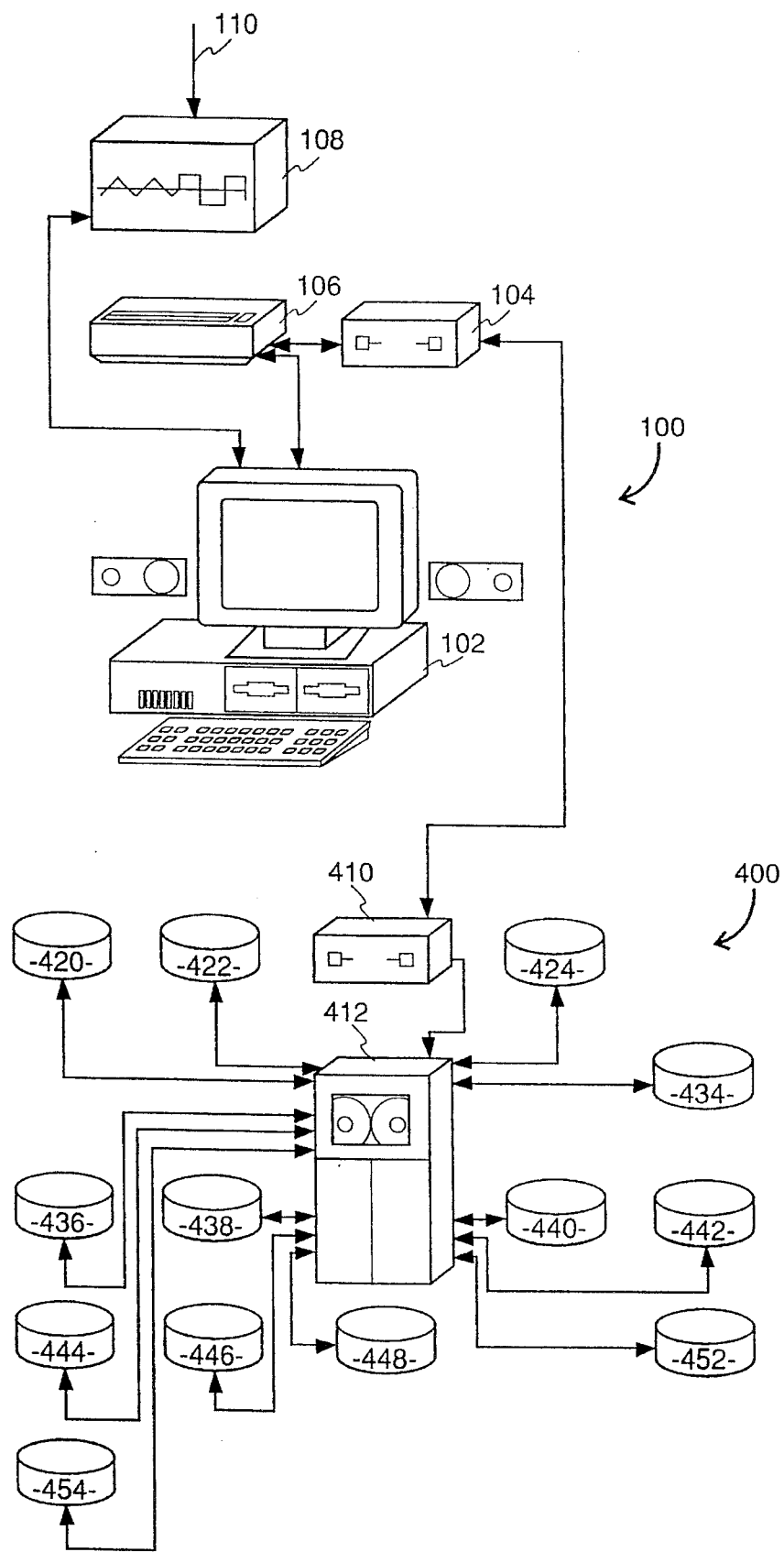
FIG. 2 is a schematic showing the flow of raw data in production to digitization, editing, transmission, and storage according to the present invention.

FIG. 2 illustrates the information flow to and from the Media's multimedia device 100 to the Server's Processor 400. The raw data is either gathered from outside sources, generally in the form of analog information 110, or entered directly at the Media's multimedia PC 102. Any analog information 110, albeit audio, video, photos, text, or graphics, must be digitized by Media's digitizer 108 to be read by the PCs used herein. The digitized information is sent directly to the Media's multimedia PC 102. Information from Real Estate Agents and other sources is received via the Media's modem 104, or by any other means, for entry into the Media's multimedia device 100. Data produced by the Media's personnel is directly entered onto the multimedia PC 102. Once entered, the information is edited at the media's multimedia PC 102, as illustrated in FIG. 3.

Figure 3:
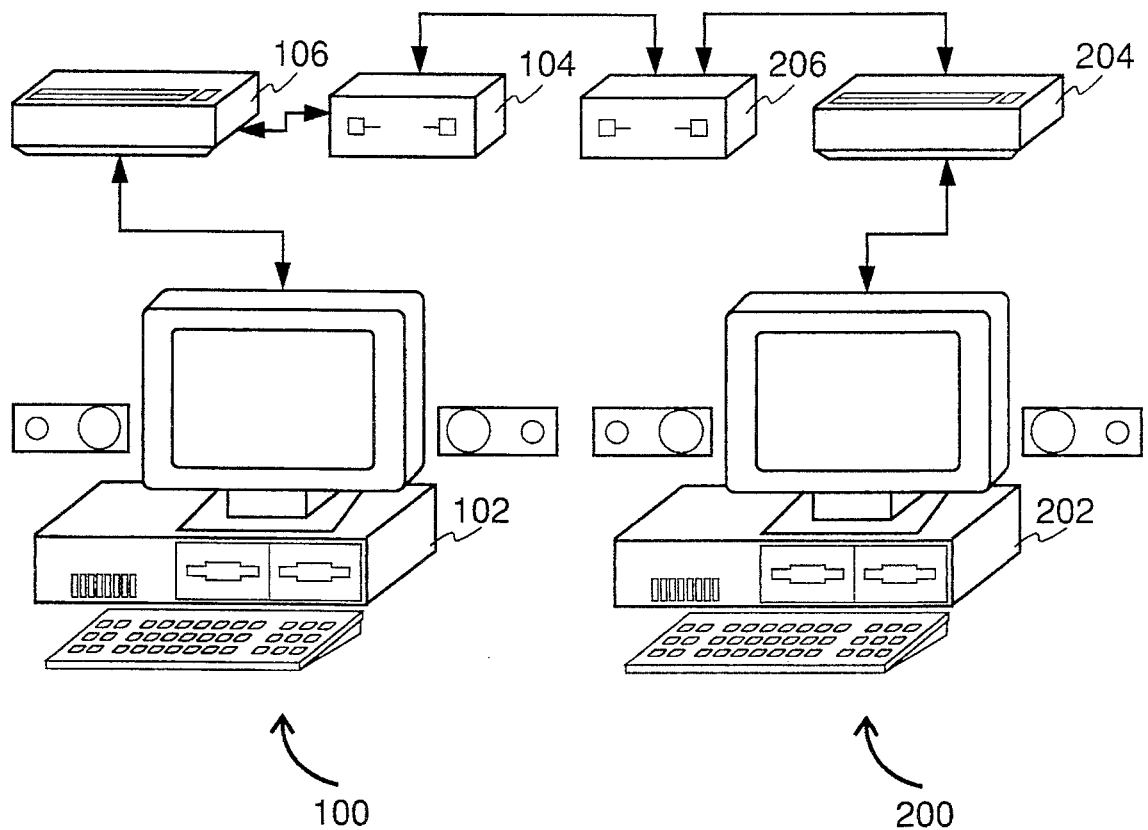
FIG. 3 is a schematic showing the flow of data being compressed and decompressed, transmitted, and proofed between the media company and the Real Estate Agent according to the instant invention.

In FIG. 3, the edited information is placed in a file which corresponds to its existing database and compressed at the Media's compress/decompress unit 106. For example, the agent property profile is sent via Media's modem 104 to the Real Estate Agent's modem 206. The new file is received via the Real Estate Agent's modem 206 where it is sent to the Real Estate Agent's compress/decompress unit 204. After decompression, the file is sent to the Agent's multimedia PC 202 for review and proofing. The Real Estate Agent enters either approval or proofing instructions at this point.

After proofing, the file is sent back to the Media's multimedia device 100 with instructions for changes. When final approval has been granted by the Agent, the file is sent, as shown in FIG. 2, via the Media's modem 104 to the Server's modem 410. Each file sent to the Server's computer 412 is designated a location, ensuring it will be stored with other similar files on the database in the Server's computer 412.

Figure 4:
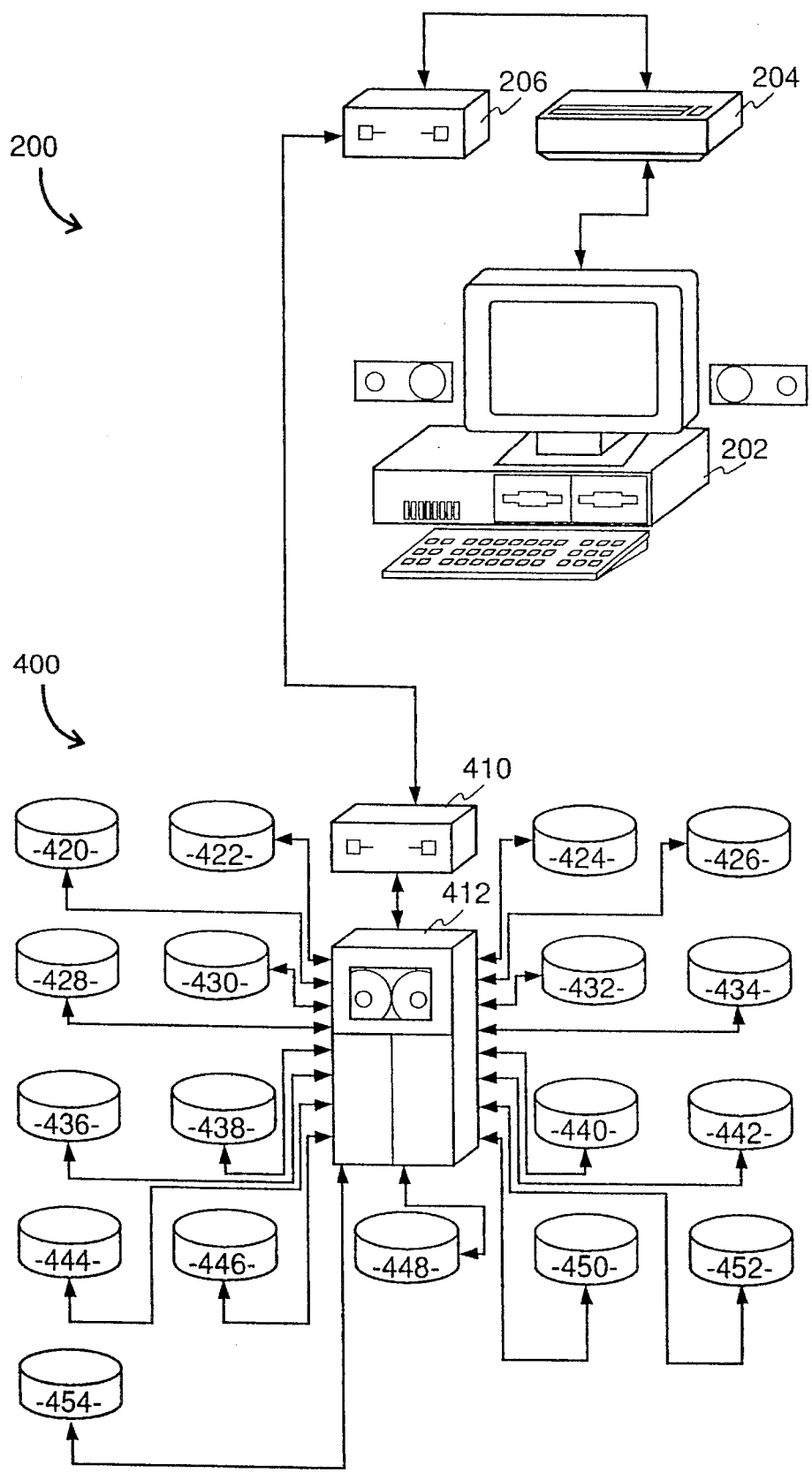
FIG. 4 is a schematic which represents the flow of data from storage at the Server's central location to the Real Estate Agent according to the present invention.

FIG. 4 depicts the information flow from the Server's Processor 400 directly to the Real Estate Agent's multimedia device 200. The request for specific files is compressed at the Real Estate Agent's compress/decompress unit 204 and sent, via Agent's modem 206, to the Server's modem 410 where it is transmitted to the Server's computer 412. The requested files are then transmitted via modems 410 and 206, decompressed 204, and accessible on the Agent's PC 202. The Agent Referral Database 426 contains information on all agents and their companies located at the Server's computer 412 for the purposes of communicating any changes at the central location. In the event an Agent procures a transaction on a property listed by another Agent, the information for referral compensation would be accessible in this database. The Agent Referral Database 426 also creates an up-to-date directory of Agents and their respective Brokers/companies.

The disclosed system allows Agents access to privileged information not available to the general public, such as the Seller's name, phone number, address, listing expiration date, and any notations entered into the file by the listing agent. The Agents would also have access to For Sale By Owner (FSBO) and Auction Profiles.

The Transaction Processing Database 428 generates and confirms appointments and significant dates for all parties involved in a real estate transaction. Specific information such as contracts pending and closing dates are communicated to the Agent Market Data Database 432 for compilation and inventory reports. The Transaction Processing Database 428 can also be used in conjunction, for example, with the Real Estate Related Services Database 442 to schedule appointments with attorneys, builders, home inspectors, bankers, or any other real estate related service needed to facilitate the real estate transaction.

The Real Estate Agent can retrieve leads generated by their own specific Agent Property Profile advertisements via the Agent Leads Database 430. The Agents can also retrieve quantitative data on general viewership of any type of real property offerings on the disclosed system via Property Retrieval Database 458 (see FIG. 1). The use of the two aforementioned Databases in conjunction with the Agent Market Data Database 432 or any other combination of databases will provide extensive market research for the Agent.

Figure 5:
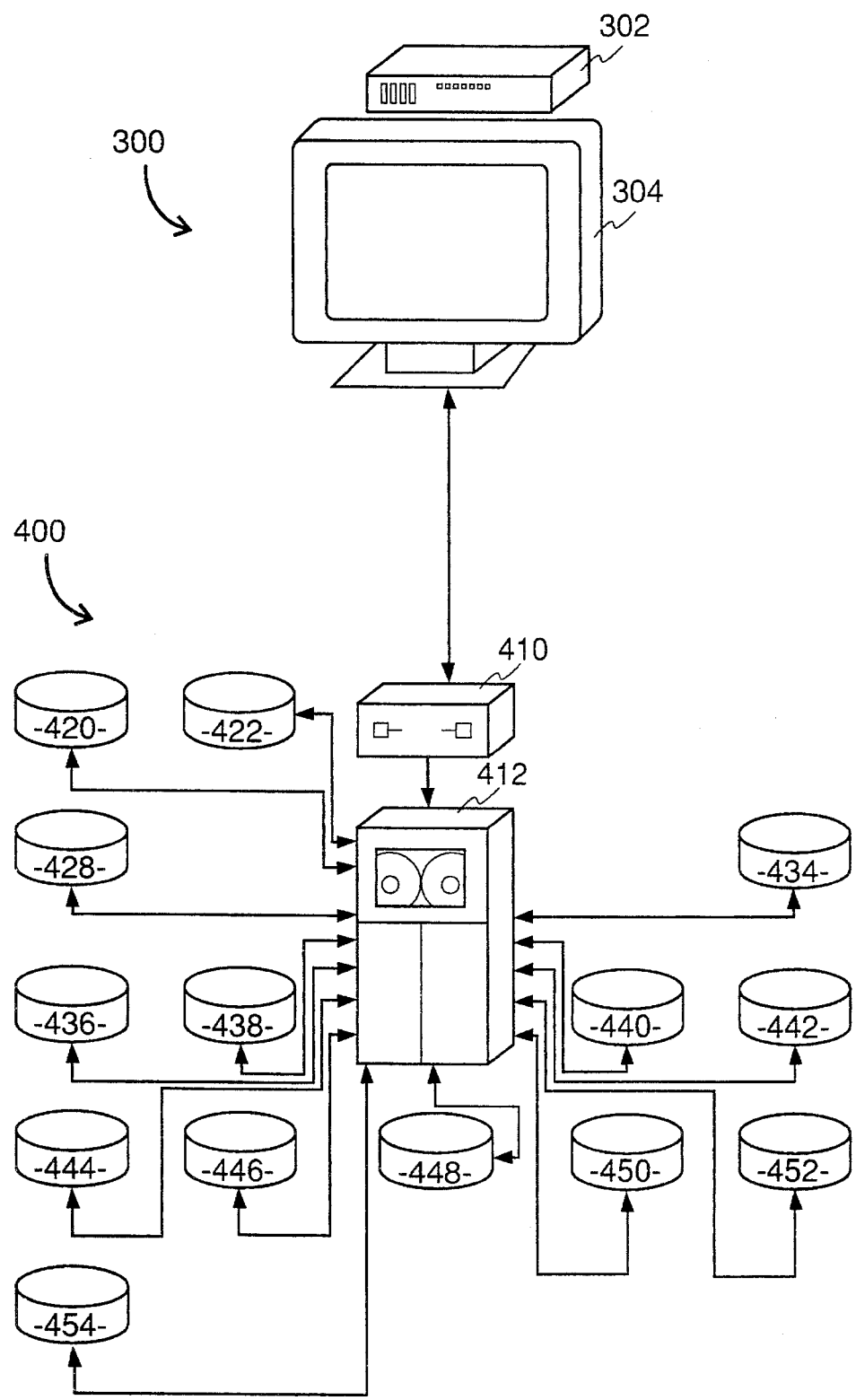
FIG. 5 is a schematic which represents the flow of data from storage at the Server's central location to the End User for viewing according to the instant invention.

FIG. 5 illustrates how the End Users access the instant system in their own homes, or offices, with the use of the End User's multimedia device 300. The End User chooses a desired community and enters certain parameters, such as type of property and price range. Utilizing the entry device on, or part of the End User's multimedia unit 302, one or all of the databases available to the End User can be accessed in any combination. The End User's multimedia unit 302 can accommodate various inputs such as remote control or preferably voice recognition. However, a keyboard, mouse or other form of entry based on the End User's choice can be utilized. The End User's request is sent to Server's modem 410, then to the Server's computer 412. The requested information is then transmitted, via modem 410, to be viewed on demand. The End User's multimedia device 300 is provided with software coding or hardware which prevents the End User from entering restricted databases. Software coding can be the access number submitted in response to a computer prompt or other methods, such as computer recognition and capture of originating phone numbers. Hardware limitations can be similar to the cable television converter box in that only certain switches are set to activate the corresponding databases.

Figure 6:
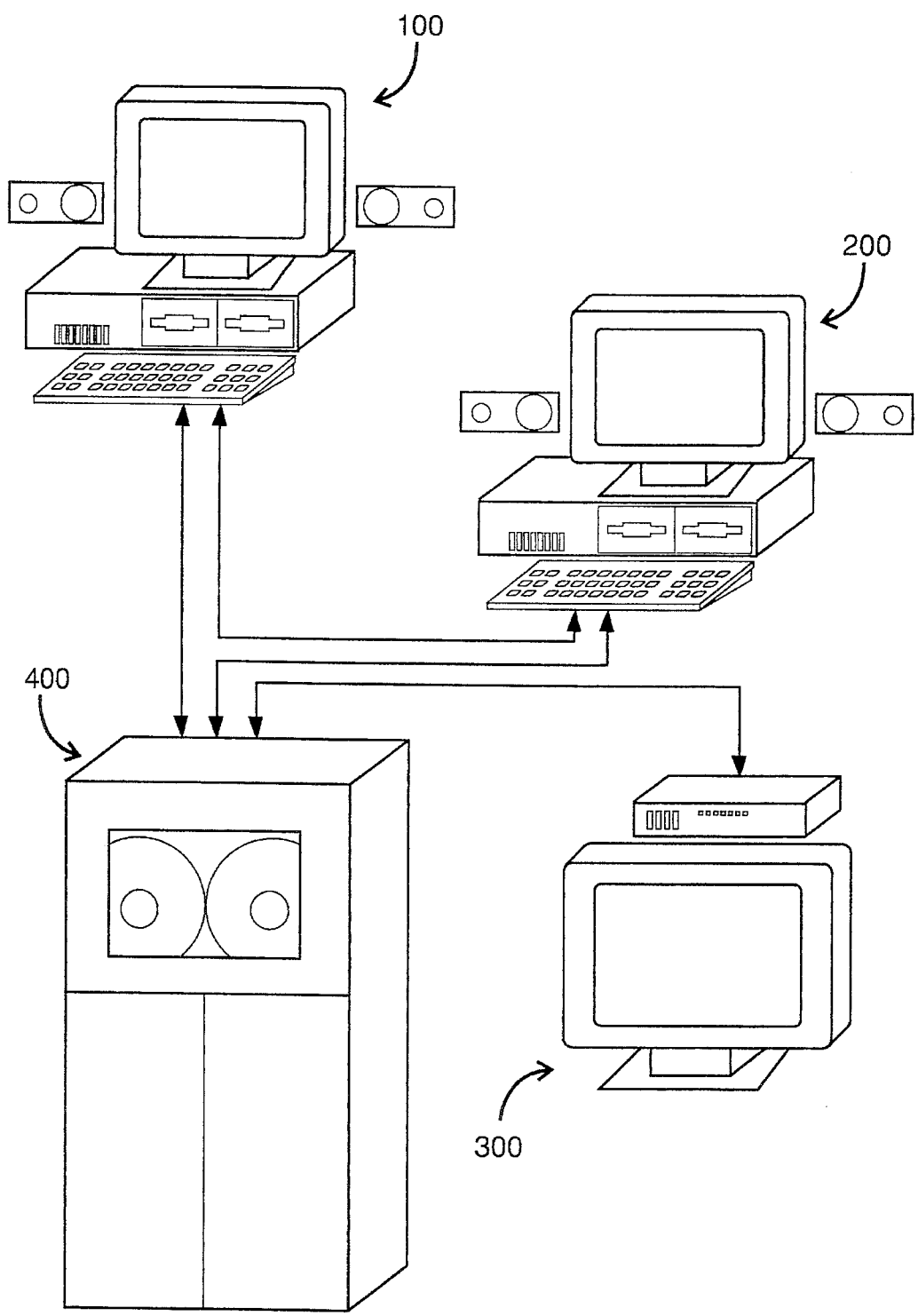
FIG. 6 is a flow chart composite of FIGS. 2 through 5 according to the present invention.

The preferred systems according to the instant disclosure are illustrated in FIG. 6. External information, such as mortgage rates, graphics and/or other enhancements, any audio script recordings, still frames and/or videos, and mortgage qualifications, would be digitized by the Media's multimedia device 100. The information is edited through use of the Media's keyboard, compressed at Media's compress/decompress unit, and sent to the Media's modem for transmission. The information is then sent to the Real Estate Agent's device 200, decompressed at Real Estate Agent's compress/decompress unit, and sent to the Real Estate Agent's multimedia PC. The Real Estate Agent reviews and edits the information through the Real Estate Agent's keyboard and returns the information through the compress/decompress unit, and transmits via the Real Estate Agent's modem back to the Media's device. The approved information is sent from the Media's device to the Server's processor 400. From there, files are sent to the Server's computer where they are stored in their appropriate databases. Real Estate Agents access information stored in the Server's processor 400 by entering an access number. When the Real Estate Agent's system is accessed, the Real Estate Agent enters his/her password, thereby tying the Real Estate Agent's device 200 into the Server's processor 400 and allowing access to the Server's computer and stored files. Real Estate Agents subscribing to the instant system can have access to all files or be excluded from certain files. Agent access to the End User database can be restricted to those particular End User files generated by the listing agent.

End Users can access the files by entering a designated access number or by other means currently available. When the instant system is accessed, the End Users enter their individual access code. The End User's multimedia device 300 accesses the Server's processor 400 and subsequently the Server's computer and stored files.

Figure 7:
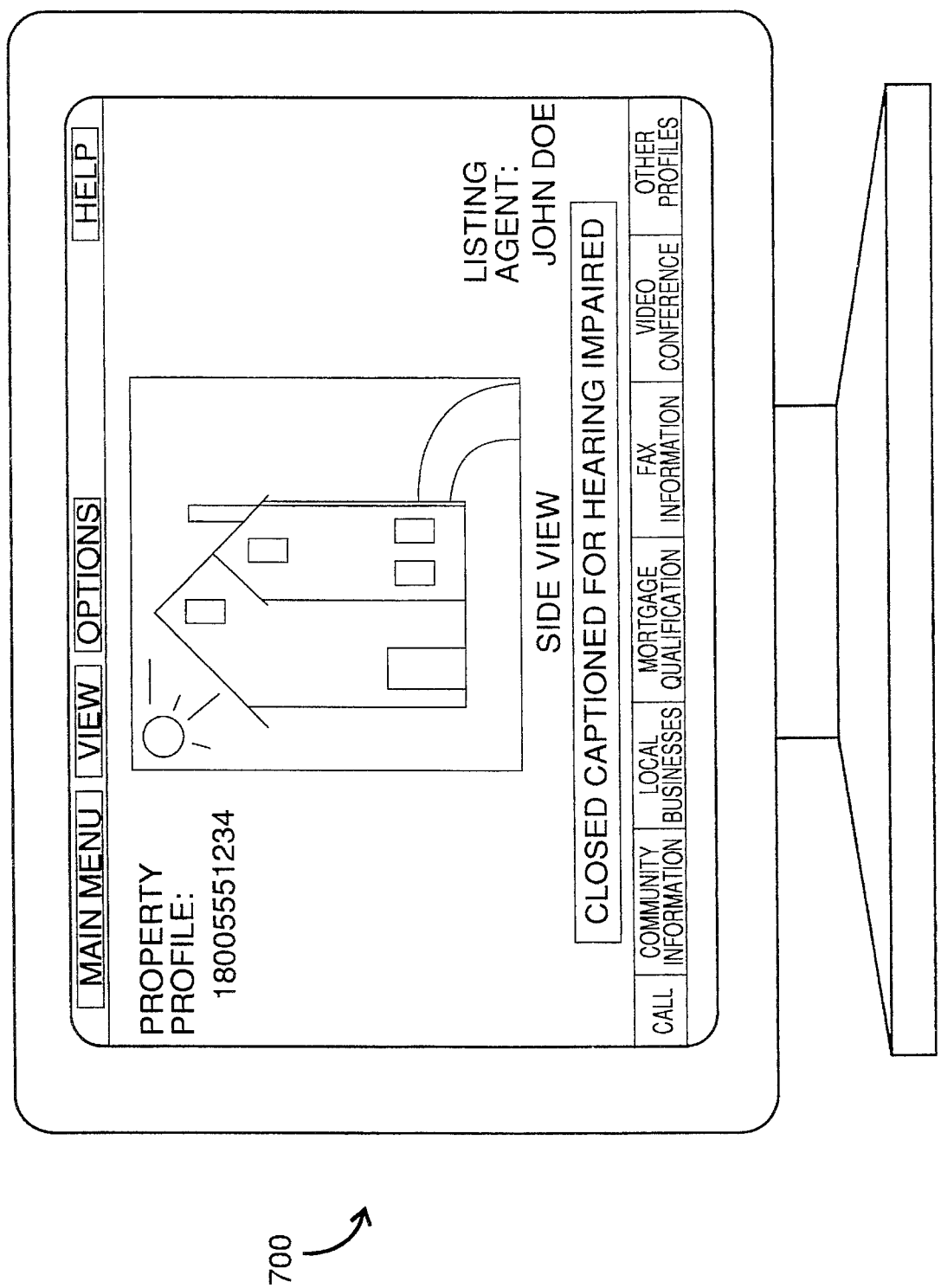
FIG. 7 is an example of one possible multimedia graphical advertisement screen according to the present invention.

FIG. 7 is an example of how an End User may view properties listed on the disclosed system. This screen 700, shows the End User receiving audio and video information on a property listed with a Real Estate Agent. In all cases, the property profile identification number is prominently displayed as is the contact person, regardless of how the property is being marketed (i.e., FSBO or Auction). The End User can directly communicate with the responsible party's office, home, mobile, or voice-mail telephone system through the Call Feature. The Fax Information Feature and Video Conference Feature can also be used as direct communication devices. In fact, the Video Conference Feature has real-time, "open house" capabilities. This feature would allow an End User to participate in an "open house" with an agent anywhere, anytime, without leaving home. Agents, or owners, showing the home plug a video camera into the audio/video input jack located on their multimedia device for communication. The End User communicates directly with the Agent through the audio portion of the Agent's multimedia device, requesting specific areas of the home to be shown by the Agent for viewing by the End user.

The Main Menu Feature allows the End User to return to the main menu of the disclosed system. Under the View Feature, the End User could fast forward, reverse, pause, zoom in/out, freeze frame, or resume play of the property or any other type of profile being viewed. Future advances in virtual reality would also be available under the View Feature. With the Options Feature, End Users could search and/or save property profiles, or delete property profiles previously viewed. The Transaction Processing Database 428 which provides calendar scheduling could also be accessed under the Options Feature.

The disclosed system would enable End Users to shop for properties of all types as well as ideas of all kinds. As an example, an End User could view numerous property profiles to gather kitchen remodeling ideas. Under the View Feature on screen 700, the End User could manipulate the kitchens to their liking, save these alterations under the Options Feature and use the Local Businesses Feature to access the Real Estate Services Related Database 442 and/or the Home Services Database 444. These two databases would allow the End User to do comparative shopping for building supplies, architects, decorators, remodeling contractors, appliance dealers, or any other type of goods or service providers needed to complete the project. Once estimates, plans, and scheduling (via the Options Feature accessing the Transaction Processing Database) were finalized, the End User would obtain detailed information on financing the new kitchen via the Mortgage Qualification Feature. The Mortgage Qualification Feature on screen 700 accesses the Mortgage Programs Database 448, Personal Mortgage Analysis Database 450, and the Mortgage Rates Database 452. Using these databases to compare loan terms and conditions, the End User could communicate directly with the lending institution of their choice. Retrieving the property profile with the desired kitchen or the altered version as the case may be, the End User can provide a complete project loan request to the lender through their multimedia device and the disclosed system.

When accessing the Community Information Feature on screen 700, a video vignette of the community chosen is aired. In addition, the Community Information Feature provides entry into Community Information Databases like Events and Attractions 438 which contains details on arts and entertainment, annual events, sports, and special events. Two other databases, Government and Civic Organizations 434 and the Educational Facilities Database 440, provide the End Users with information on schools, civic organizations, and churches which often Agents are not permitted by ethics or law to discuss.

Figure 8:
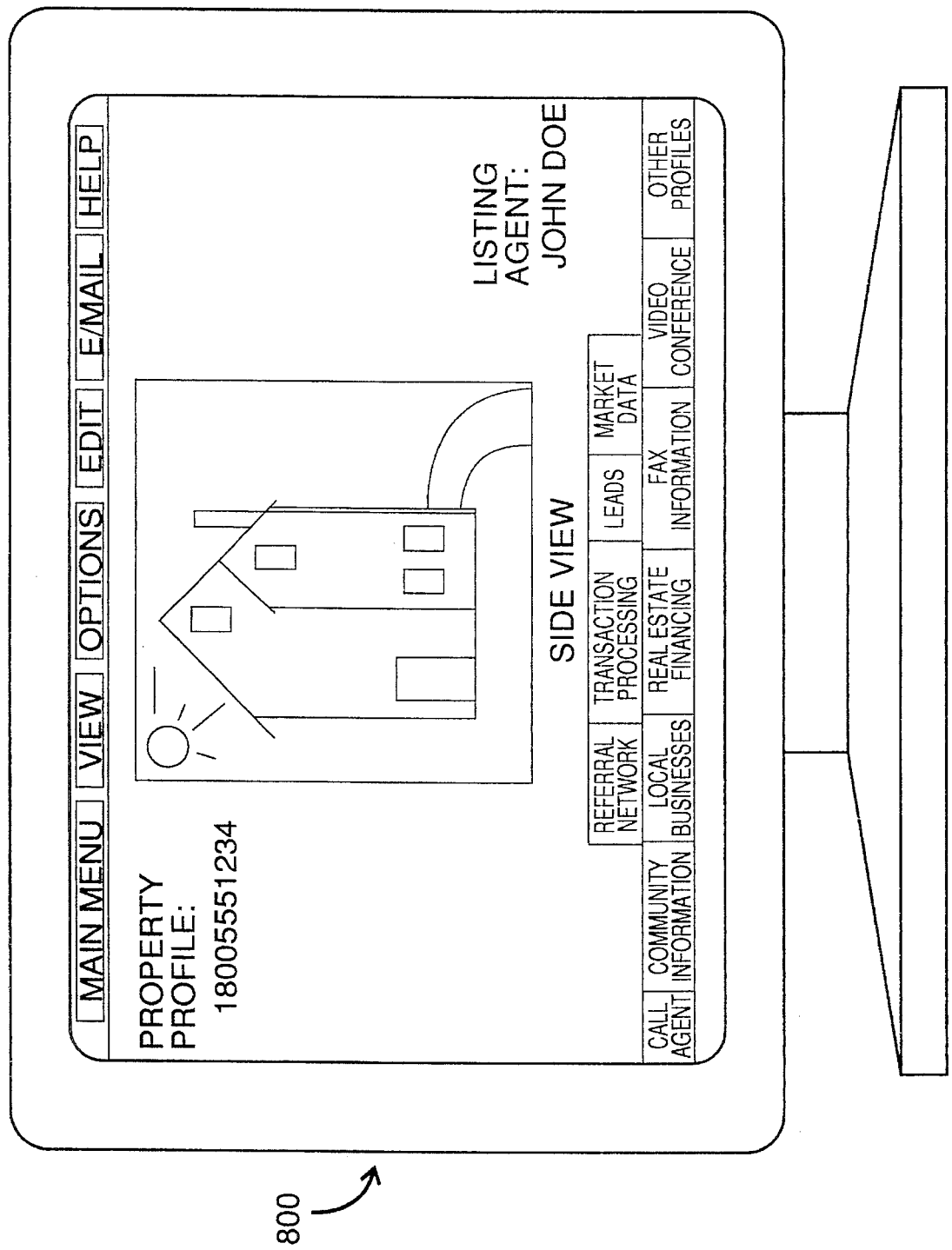
FIG. 8 is an example of one possible graphical advertisement screen used by Real Estate Agents according to the instant invention; and, FIG. 9 is an example of one possible graphical advertisement screen used by Demographic Retrieval Users according to the instant invention.

FIG. 8 is an example of how a Real Estate Agent may view and retrieve information in the disclosed system. Features specific to the Agents screen 800, include an Edit Feature which allows Agents to proof the data produced by the Media and an Electronic Mail (E-Mail) Feature which transfers privileged and proprietary information to other Agents who are users of the instant invention. The sample screen in FIG. 8 also displays four primary databases the Agent would utilize frequently. They are the Referral Network Database, Transaction Processing Database, Agent Leads Database (Leads), and Market Data Database.

As one example, the instant invention gives Agents extensive information which can be used when obtaining property listings from owners. To get new listings, Agents could provide the owners with information regarding the length of time it currently takes to market their type of property, obtain a bona fide contract, and close on a property similar to the owners'. This information is derived from contracts pending, contracts closing, and sales-to-date data available in the Transaction Processing Database and the inventory reports available from the Market Data Database which compiles quantitative property profile data from the FSBO, Auction, and Agent Listing Property Profiles Databases. The property profile databases (FSBO, Auction, and Agent Listings) collectively provide the Agent and Owner with how many similar type properties are currently on the market and marketed via the disclosed system.

By accessing the Agent Leads Database (Leads Feature, screen 800), the level of market interest in similar properties could also be obtained. This information would be available for last week, prior month, previous quarter, or even last year. Because the disclosed invention is not limited to locality or geographic boundaries, the instant invention enables the Agent to market the property wherever the disclosed system is available. Utilizing the Referral Network Database, the Agent can provide the owner with other Agents on the disclosed system who can assist them with their real estate needs elsewhere.

Figure 9:

FIG. 9 is a sample display screen 900 of Demographic Retrievals. Because each property profile and advertisement regardless of sponsor has its own identification code and each user of the disclosed system has their own access code, the instant invention provides detailed data on all aspects of viewership and response. When, where, and how often an advertisement and/or profile is viewed is instantly recorded by the disclosed system. The instant invention is a measurable advertising medium which measures advertising in terms of exposure, response, and level of interest. Viewership and response patterns can be retrieved by advertisers, agents, and subscribers via the disclosed system's demographic retrieval databases: Property Inquiry, Property Retrieval, Advertiser Inquiry, and Advertiser Retrieval. As the screen 900 example illustrates, viewership and exposures as well as inquiries and/or response can be retrieved on a National, Regional, State, or Local basis. Custom retrievals as a result of testing various advertising appeals/offers is also available. The disclosed system could provide levels of interest and psychographic profiles by questioning viewers at various points.

The instant system supplies advertisers, agents, and subscribers with a daily picture of the local, state, regional, and national real estate market. Property inquiries from one geographic location to another are recorded so moving patterns can be traced. Demographic data compiled, merged, and sorted from the present invention can be used for a variety of purposes, but market trends and research as well as targeting advertising messages would be the primary use. As an example, a bank which advertises its mortgage programs and rates in the Mortgage Programs Database and Mortgage Rates Database could use the instant invention's demographic retrievals to determine if there was an increasing demand for housing in their area which could bring new deposit account relationships as well as the opportunity to book new mortgages. If housing demands were increasing as revealed by information retrieved on the disclosed system, the bank could rationalize the approval of a new development loan to a developer and subsequent credit line extensions to area builders, general contractors, excavation companies, paving contractors, and any other type of related business or service provider needed to fulfill the forecasted demand. To generate the aforementioned business, the bank could then advertise exclusively to these entities via the disclosed system.

Another example of advertising to advertisers within the instant system is a window manufacturer introducing a new window design and production technique. The window manufacturer could access the Home Services and/or Real Estate Related Services databases and target their advertising message to builders, architects, building supply centers, and remodeling contractors. Through the instant invention, product demonstrations and the manufacturing process could be shown to the target audience and product acceptance, inquiries, and orders could be monitored and obtained. At the same point, the disclosed system would allow the window manufacturer to advertise their new window design and production technique to the End User who could receive an electronic coupon redeemable at the local building supply center, thus generating store traffic for the retailer and providing accountability for the advertising message from manufacturer to wholesaler, to retailer, to the End User, and all through the instant invention.

Users of the demographics generated by the instant invention can increase business to existing customers, generate new customers, and target potential customers early in their decision process.

In the public sector, both local and state governments can use the instant system to forecast demand for public goods and services such as new roads, schools, parks, and utility requirements. As a side note, this same sector of the economy could sponsor the information contained in the Community Profiles Database. In most cases, an advertiser of any type of goods or services on the disclosed system would be a user of the demographic retrievals since it accounts for their advertising dollar and identifies where to concentrate future advertising expenditures.

The mainframe, or computer used as a Server, can be any one of many known computers, such as an IBM/370 running MVS and VTAM and any of many available database and support programs, or a Sun workstation running UNIX and any of many database programs available. The specific property profiles of individual properties are preferably stored as individual records of a database file containing all such records, or some portion thereof. Preferably the records contain relevant information located in appropriate fields, including fields containing the digitized images and audio, or an address where the digitized images are located. Preferably the Server has a system with appropriate password entry and protection abilities. The software on the Server has codes present for blocking out certain fields of the specific property file records, or certain information for the property files which contains specific information intended for the Real Estate Agent's access, but not the End User's or Subscriber's access. This function can alternatively be performed at the End User's or Subscriber's terminal.

The display portion of the foregoing multimedia device 300 can be a television, computer monitor, high density television or virtual reality device. Although the current virtual reality devices are expensive and have not yet reached their full potential, they would provide enhanced viewing of the property. As display technology improves, enhanced viewer involvement with properties will also occur. The instant system allows the flexibility to incorporate any of the current, as well as the future, technologies.

The software for configuring the system is easily built using standard database development techniques well known to those skilled in the art, based on the configurations described herein and the selection of the desired options. The multimedia terminals may be common personal computers, such as an IBM or compatible with a 386 microprocessor, appropriate video for displaying graphics, and a sound card for audio. Software for controlling the communication with the Server can be Windows based, and is easily built using known techniques based on the configurations described herein. An alternative End User system utilizing a cable television network and decoder box can also be implemented using known techniques.

Due to the versatility in programming, different categories of access codes can be implemented depending on a user's classification. Access codes can also determine the billing rate for the user. Prospective home purchasers could pay for the service viewed in their home on a time usage basis and billing could occur through their local cable company or other entity.

The following is an example of a system of the instant invention. This example is for illustration purposes and should not be viewed as limiting the scope of the invention. The Server's processor is presently at a centralized location, and all Agent, Media, Subscriber, Advertiser and End User units tie into this centralized unit. The Media multimedia devices include an image scanner which digitizes photographs, an A/D converter, and microphone for audio scripts. At the Media's location, advertisements for property are produced which contain a digitized picture or series of pictures, and a voice description of aesthetic elements of the property. Information describing the important features of the property, including acreage, rooms and room sizes, address, owner, the listing Agent and other relevant information are entered by a computer keyboard present in the Media's multimedia device. The assembled information on a given property is compressed and sent via modem over telephone lines to a computer, where a file in a database is produced containing all relevant information. Before being sent to the computer, the assembled information may be sent to a Real Estate Agent for approval and modification.

An End User interested in purchasing a property has a microcomputer with the required multimedia capability and installed software enabling an interactive session to be established with the computer via a modem and telephone lines. The End User begins by logging onto the system and giving an identifier which enables the system to give End User level access. The End User enters information about their needs which includes intended purchase price range, property type, geographical interests, and the like. A menu is presented through which the End User can select from several options including mortgage information, community information, property information and industry-related goods and/or services from Advertisers. Based on the End User's information, a set of property or advertisement files are sent via the compress/decompress units and modems to the End User. The End User can then browse through the property profiles, viewing the digitized pictures while listening to detailed property descriptions.

If the End Users find properties which they are interested in, the End Users can then go to a Real Estate Agent to have the property shown. At the Real Estate Agent's office, an Agent's multimedia system, including a compress/decompress unit, a modem, and multimedia computer, is present. The Agent can gain access to information on properties to which the End Users were prevented access, such as the precise address and owner's telephone number, and, through this additional information, arrange to show the property to the interested party.

GLOSSARY

Media's multimedia device 100
Media's multimedia PC 102
Media's modem 104
Media's compress/decompress unit 106
Media's digitizer 108
Analog information 110
Real Estate Agent's multimedia device 200
Real Estate Agent's multimedia PC 202
Real Estate Agent's compress/decompress unit 204
Real Estate Agent's modem 206
End User's multimedia device 300
End User's multimedia unit 302
End User's viewing device 304
Server's processor 400
Server's modem 410
Server's computer 412
For Sale By Owner database 420
Auction property database 422
Agent property files 424
Agent referral database 426
Transaction processing database 428
Agent leads database 430
Agent market data database 432
Government and civic organization database 434
Community profiles database 436
Events and attractions database 438
Educational facilities database 440
Real estate related services database 442
Home services database 444
Restaurant and lodging database 446
Mortgage programs database 448
Personal mortgage analysis database 450
Mortgage rates database 452
Real estate notes database 454
Property inquiry database 456
Property retrieval database 458
Advertiser inquiry database 460
Advertiser retrieval database 462

What is claimed is:

1. A method of acquiring and displaying real estate information utilizing an information processing system containing file server means for serving files, said file server means having i/o means for receiving and transmitting data, and database storage means for storing information in database files, the method comprising the steps of:

a) receiving real estate related information;

b) storing digitized real estate data and related information as information records in said database storage means of said file server means in a manner in which data can be selectively accessed;

c) receiving digital electronic first end user information from a first end user relating to said first end user's real estate needs;

d) selectively providing digital electronic information of portions of said real estate data based on said digital electronic end user information;

e) accessing data files by said first end users, said accessing data files by said first end users being a plurality of inquiries from individual first end users, said end user inquiries being the retrieving and viewing of text and/or graphic data from a database;

f) generating a demographics information database by compiling and merging a plurality of first end user inquiries and storing said compiled and merged inquiries; and g) providing a second end user with said demographic information, said demographics information corresponding to the specific text and graphic data selected from said database files by said first end users.

2. The method of claim 1, where each of said text and graphic data in said database files is assigned a code, and wherein said generating a demographics information database comprises compiling, merging and storing the codes for the text and graphic data viewed by said first end user.

3. A method of acquiring and displaying property related information utilizing an information processing system containing media means for receiving analog and digitized data and transmitting digitized data; file server means for receiving data from said media means, receiving data inquiries and transmitting data in response to said data inquiries; databases and database storage means for sorting, storing and retrieving information received, the method comprising the steps of:

a) receiving property related information at said media means;

b) transmitting said property related information in appropriate format to said file server means;

c) said file server means analyzing said property related information and storing said property related information in related database storage means, d) said file server means receiving an information request from multiple end users relating to the end users' information needs, the extent of information available to said end users being determined by said users' access code;

e) selectively providing computerized information in response to said end users' information requests, f) said end users' information requests being a plurality of inquiries from individual first end users, said end user inquiries being the retrieving and viewing of text and/or graphic data from a database; and g) generating and updating a demographics pattern database by compiling and merging a plurality of first end user inquiries and storing said compiled and merged inquiries.

4. The method of claim 3, further comprising the steps of h) receiving an information request from an agent relating to the agent's information needs, each agent having an access code, the extent of information available to said agent being determined by said agent's access code, i) selectively providing said information in response to said agent's information request, j) said agent's information requests being a plurality of inquiries from a plurality of individual agents, said end user inquiries being the retrieving and viewing of text and/or graphic data from a database;

k) generating and updating further said demographics pattern database information by compiling and merging a plurality of agents' inquiries and storing said compiled and merged inquiries in a demographics database, and wherein each time said server is accessed, data obtained through said access analysis is stored in the appropriate databases as demographic information, thereby continually updating and increasing the available demographics information within the databases.

5. A system of tracking real estate and real estate related demographic information using a computer network system comprising:

a media unit, said media unit having:
    a multimedia computer;
    a digitizer, said digitizer receiving information from outside said network system and within said multimedia computer;
    i/o means, a server's unit, said server's unit having:
    a computer, said computer having storage capabilities;
    communication means, said communication means enabling said server to interact with remote terminals;
    a plurality of databases, at least one of said plurality of databases being an automatically updated demographic pattern database, said demographics pattern database being updated automatically by analyzing database information requests, said database information requests being a plurality of inquiries from a plurality of individual remote terminals, said remote terminal inquiries being the retrieving and viewing of text and/or graphic data from a database;
    demographic database updating means, said updating means automatically updating said demographics pattern database by compiling and merging a plurality of end user inquiries and storing said compiled and merged inquiries in said demographics pattern database.

6. The system of tracking real estate and real estate related of claim 5, further comprising access software, said access software having access codes, said access codes corresponding to each of said databases;

the first of said remote terminals being an agent's unit, said agent's unit having:
    a computer, said computer having display means;
    i/o means, said i/o means being in communication with said computer; and storage capabilities;

the second of said remote terminals being a subscriber's unit, said subscriber's unit having:
    converter means;
    storage capabilities;
    a viewing screen; and
    i/o means;

the third of said remote terminals being an end user's unit, said end user's unit having:
    converter means;
    storage capabilities;
    a viewing screen; and
    i/o means;

wherein information is received by said multimedia computer from multiple sources, analyzed, edited and transmitted to said server's unit for storage in the appropriate databases, activation of said subscriber's unit causes a specific request sequence to issue, thereby controlling the information provided to said subscriber, said subscriber's response to said specific request sequence providing information to said network for entry into appropriate databases, thereby constantly updating the databases, activation of said agent's unit causes a specific request sequence to issue, thereby controlling the information provided to said agent, said agent's response to said specific request sequence providing information to the network for entry into appropriate databases, thereby constantly updating the databases, and activation of said end user's unit causes a specific request sequence to issue, thereby controlling the information provided to said end user, said end user's response to said specific request sequence providing information to the network for entry into appropriate databases, thereby continuously updating said databases.

7. The system of tracking real estate and real estate related information of claim 6, further comprising means for storing advertising information, said end user's unit and said agent's unit being configured to select from, receive, and display said advertising information for display on a terminal, said server's unit including means for generating demographic data from inquiries for advertising information, storing said demographic data in said demographic pattern database, and means for retrieving demographic patterns from said demographic pattern database generated from inquiries for advertising information.

8. The system of tracking real estate and real estate related information of claim 7, further comprising means for storing financial information, said end user's unit and said agent's unit being configured to select from, receive, and display said financial information for display on a terminal, said server's unit including means for generating demographic data from inquiries for financial information, storing said demographic data in said demographic pattern database, and means for retrieving demographic patterns from said demographic pattern database generated from inquiries for financial information.

9. The system of tracking real estate and real estate related information of claim 6, further comprising means for storing advertising and financial information, said end user's unit and said agent's unit being configured to select from, receive, and display said advertising and financial information for display on a remote terminal.

* * * * *

UNITED STATES PATENT AND TRADEMARK OFFICE
CERTIFICATE OF CORRECTION

PATENT NO.       : 5,584,025 C1                                    Page 1 of 1
APPLICATION NO.  : 90/007046
DATED            : March 20, 2007
INVENTOR(S)      : Ronald D. Keithley and Kevin L. Keithley It is certified that error appears in the above-identified patent and that said Letters Patent is hereby corrected as shown below:

On the title page before item (57) insert item (74)
-- Advantia Law Group
  Michael W. Starkweather
  Jason P. Webb --

Signed and Sealed this

Fourteenth Day of August, 2007

JON W. DUDAS
*Director of the United States Patent and Trademark Office*

US005584025C1

(12) EX PARTE REEXAMINATION CERTIFICATE (5711th)
United States Patent
Keithley et al.

(10) Number: US 5,584,025 C1
(45) Certificate Issued: Mar. 20, 2007

(54) APPARATUS AND METHOD FOR INTERACTIVE COMMUNICATION FOR TRACKING AND VIEWING DATA

(75) Inventors: Ronald D. Keithley, Charlottesville, VA (US); Kevin L. Keithley, Earlysville, VA (US)

(73) Assignee: Tren Technologies Holding, LLC, Philadelphia, PA (US)

Reexamination Request:
No. 90/007,046, May 22, 2004

Reexamination Certificate for:
Patent No.: 5,584,025
Issued: Dec. 10, 1996
Appl. No.: 08/420,701
Filed: Apr. 12, 1995

Related U.S. Application Data

(63) Continuation of application No. 08/145,399, filed on Oct. 29, 1993, now abandoned.

(51) Int. Cl.
*G06F 17/40* (2006.01)

(52) U.S. Cl. .................................................. 707/104.1
(58) Field of Classification Search ................. 707/1–3, 707/10, 104.1; 715/500
See application file for complete search history.

(56) References Cited

U.S. PATENT DOCUMENTS

| | | | |
|---|---|---|---|
| 4,994,971 A | 2/1991 | Poelstra | |
| 5,185,857 A | 2/1993 | Rozmanith et al. | |
| 5,191,406 A | 3/1993 | Brandestini et al. | |
| 5,325,297 A | 6/1994 | Bird et al. | |

OTHER PUBLICATIONS

Blaco, Rock, "Electronic Markers Bring It All Back Home", Corporate Computing, Aug. 1992, pp. 201–202.*
Hlava, Marjorie and Saywer, ED, "Database Design and Construction", Information Today, May 1992, pp. 7–8.*
Bel Bruno, Ron, "Real–Time Real Estate", Personal Computing, Oct. 1989, p. 59.

Blanco, Rock, "Electronic Markets Bring It All Back Home", Corporate Computing, Aug. 1992, pp. 201–202.
Freedman, Eric, "PCs Prove To Be The Real Estate Thing", PC Magazine, Mar. 5, 1985, p. 60.
Greenstein, "AT&T Joins Realtors In Home Sales", MIS Week, Jun. 27, 1984, pp. 1 and 30.
Hlava, Marjorie and Sawyer, Ed, "Database Design And Construction", Information Today, May 1992, pp. 7–8.
Liebman, Hanna, "The Microchip Is The Message", Mediaweek, Nov. 2, 1992, pp. 23–29.
Raeder, Aggi, "Is There A Prodigy In Your Future?", Database Searcher, Jun. 1989, pp. 18–25.
Skelton, Ron, "Continental Probes The Videotex Market", Telephone Engineer & Management, Apr. 1, 1983, pp. 49–55.
Warrock, Anna M., "High Tech Innovations In Home Sales In Boston", New England Business, Sep. 21, 1987, pp. 61–62.
Reidy, Chris, "Computer Flap: Is Speech Free On Prodigy?", The Boston Globe, Jan. 30, 1991, p. 35.
Ziegler, Bart, "Prodigy, The Sears–IBM Home Computer Venture, Goes Nationwide", The Associate Press Business News, Sep. 7, 1990.

* cited by examiner

*Primary Examiner*—Alford W. Kindred

(57) ABSTRACT

An information processing system for acquiring and displaying information relating to a specific industry or interest, the example herein being real estate and related goods and services. The system comprises a server which has an input/output device for receiving and transmitting data, database files, and database storage. A media terminal for producing files, including digitized property descriptions, is provided. The media terminal has a digitizer for analog/digital signal converting, an i/o device for transmitting, and a data entry device. An end user terminal provides the ability to enter, transmit, receive and display data to and from the file server. An agent's terminal is equipped to enter and display data, as well as transmit information to and from the file server. The system is configured such that real estate information is received at the media terminal, edited, and, once approved, stored at the file server. The information is accessible from either the agent's or end user's terminals. The compilation of information in the databases includes demographic statistics which are usable by Advertisers and various industry related entities.

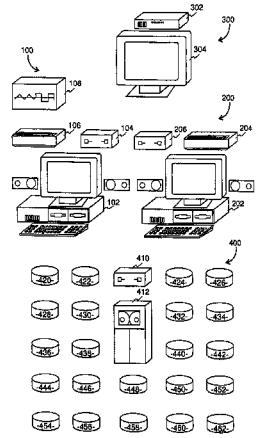

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–9 is confirmed.

New claims 10–75 are added and determined to be patentable.

10. *The method of claim 1, wherein the plurality of first end user inquiries compiled and merged in paragragh f) comprises:*

*the retrieving and viewing of text and/or graphic data for at least one specific property.*

11. *The method of claim 1, wherein the plurality of first end user inquiries compiled and merged in paragraph f) comprises:*

*the retrieving and viewing of text data for at least one specific property.*

12. *The method of claim 1, wherein the plurality of first end user inquiries compiled and merged in paragraph f) comprises:*

*the retrieving and viewing of graphic data for at least one specific property.*

13. *The method of claim 1, wherein the plurality of first end user inquiries comprises:*

*determining how often the first end user is retrieving and viewing a certain text and/or graphic data from the database.*

14. *The method of claim 1, wherein the plurality of first end user inquiries comprises:*

*determining exposure time of the first end user by monitoring the retrieving and viewing of the first end user of the text and/or graphic data from the database.*

15. *The method of claim 1, wherein the plurality of first end user inquiries comprises:*

*determining a response of the first end user by monitoring the retrieving and viewing of the first end user of the text and/or graphic data from the database.*

16. *The method of claim 1, wherein the plurality of first end user inquiries comprises:*

*determining a level of interest of the first end user by monitoring the first end user's retrieving and viewing of text and/or graphic data from the database.*

17. *The method of claim 1, wherein the generating of the demographics information database by compiling and merging the plurality of first end user inquiries, comprises:*

*determining viewership patterns of the plurality of end users by monitoring the retrieving and viewing of the first end users of the text and/or graphic data from the database.*

18. *The method of claim 1, wherein the generating of the demographics information database by compiling and merging the plurality of first end user inquiries, comprises:*

*determining response patterns of the plurality of end users by monitoring the retrieving and viewing of the first end users of the text and/or graphic data from the database.*

19. *The method of claim 1, wherein the plurality of first end user inquiries compiled and merged in paragraph (f) comprises the retrieving and viewing of at least one advertising message.*

20. *The method of claim 1, wherein the plurality of first end user inquiries compiled and merged in paragraph (f) comprises the retrieving and viewing of graphic data for at least one specific property over a specified period of time.*

21. *The method of claim 1, wherein the second end user comprises a real estate agent, wherein the plurality of first end user inquiries compiled and merged in paragraph (f) comprises the retrieving and viewing of text and/or graphic data for at least one specific property.*

22. *The method of claim 1, wherein the second end user comprises an advertiser, wherein the plurality of first end user inquiries compiled and merged in paragraph (f) relate to industry-related goods or services.*

23. *The method of claim 1, wherein the second end user comprises a financial institution.*

24. *The method of claim 1, wherein the second end user comprises a governmental entity.*

25. *The method of claim 1, wherein the plurality of first end user inquiries compiled and merged in paragraph (f) comprise retrieval and viewing of a plurality of property profiles in a particular geographic region.*

26. *The method of claim 1, wherein the plurality of first end user inquiries compiled and merged in paragraph (f) comprise retrieval and viewing of information relating to particular goods or services.*

27. *The method of claim 1, wherein the plurality of first end user inquiries compiled and merged in paragraph (f) comprise retrieval and viewing of information relating to an end user order for particular goods or services.*

28. *The method of claim 1, wherein providing the second end user with demographics information comprises providing the second end user with information on the number of first end user inquiries in a particular geographic region, wherein the inquiries comprise retrieving and viewing at least one property profile.*

29. *The method of claim 1, wherein providing the second end user with demographics information comprises providing the second end user with information on the number of first end user inquiries in a particular geographic region, wherein the inquiries comprise retrieving and viewing at least one advertisement.*

30. *The method of claim 1, wherein providing the second end user with demographics information comprises providing the second end user with information on the number of first end user inquiries in a particular geographic region during a particular time period, wherein the inquiries comprise retrieving and viewing at least one property profile.*

31. *The method of claim 1, wherein providing the second end user with demographics information comprises providing the second end user with information on the number of first end user inquiries in a particular geographic region during a particular time period, wherein the inquiries comprise retrieving and viewing at least one advertisement.*

32. *The method of claim 1, wherein the demographic information is useable by the second end user for targeting advertising messages for particular goods or services.*

33. *The method of claim 1, wherein the demographic information is useable by the second end user for targeting advertising messages to end users accessing the data files.*

34. *The method of claim 1, wherein the demographic information is useable by the second end user for determining advertising expenditures for particular goods or services.*

35. The method of claim 3, wherein the plurality of first end user inquiries compiled and merged in paragraph f) comprises:
the retrieving and viewing of text and/or graphic data for at least one specific property.

36. The method of claim 3, wherein the plurality of first end user inquiries comprises:
determining how often the first end user is retrieving and viewing a certain text and/or graphic data from the database.

37. The method of claim 3, wherein the plurality of first end user inquiries comprises:
determining exposure time of the first end user by monitoring the retrieving and viewing of the first end user of the text and/or graphic data from the database.

38. The method of claim 3, wherein the plurality of first end user inquiries comprises:
determining a response of the first end user by monitoring the retrieving and viewing of the first end user of the text and/or graphic data from the database.

39. The method of claim 3, wherein the plurality of first end user inquiries comprises:
determining a level of interest of the first end user by monitoring the first end user's retrieving and viewing of text and/or graphic data from the database.

40. The method of claim 3, wherein the generating of the demographics pattern database by compiling and merging the plurality of first end user inquiries, comprises:
determining viewership patterns of the plurality of end users by monitoring the retrieving and viewing of the first end users of the text and/or graphic data from the database.

41. The method of claim 3, wherein the generating of the demographics pattern database by compiling and merging the plurality of first end user inquiries, comprises:
determining response patterns of the plurality of end users by monitoring the retrieving and viewing of the first end users of the text and/or graphic data from the database.

42. The method of claim 3, wherein the plurality of end user inquiries compiled and merged comprises the retrieving and viewing of at least one advertising message.

43. The method of claim 3, wherein the plurality of end user inquiries compiled and merged comprises the retrieving and viewing of graphic data for at least one specific property over a specified period of time.

44. The method of claim 3, wherein the end user includes a real estate agent, wherein the plurality of end user inquiries compiled and merged comprises the retrieving and viewing of text and/or graphic data for at least one specific property.

45. The method of claim 3, wherein the end user comprises an advertiser, wherein the plurality of end user inquiries compiled and merged relate to industry-related goods or services.

46. The method of claim 3, wherein the end user comprises a financial institution.

47. The method of claim 3, wherein the end user comprises a governmental entity.

48. The system of claim 5, wherein the plurality of end user inquiries compiled and merged comprises:
the retrieving and viewing of text and/or graphic data for at least one specific property.

49. The system of claim 5, wherein the plurality of end user inquiries comprises:
determining how often the end user is retrieving and viewing a certain text and/or graphic data from the database.

50. The system of claim 5, wherein the plurality of end user inquiries comprises:
determining exposure time of the end user by monitoring the retrieving and viewing of the end user of the text and/or graphic data from the database.

51. The system of claim 5, wherein the plurality of end user inquiries comprises:
determining a response of the end user by monitoring the retrieving and viewing of the end user of the text and/or graphic data from the database.

52. The system of claim 5, wherein the plurality of end user inquiries comprises:
determining a level of interest of the end user by monitoring the end user's retrieving and viewing of text and/or graphic data from the database.

53. The system of claim 5, wherein the updating of the demographics pattern database by compiling and merging the plurality of end user inquiries, comprises:
determining viewership patterns of the plurality of end users by monitoring the retrieving and viewing of the end users of the text and/or graphic data from the database.

54. The system of claim 5, wherein the updating of the demographics pattern database by compiling and merging the plurality of end user inquiries, comprises:
determining response patterns of the plurality of end users by monitoring the retrieving and viewing of the end users of the text and/or graphic data from the database.

55. The system of claim 5, wherein the plurality of inquiries compiled and merged comprises the retrieving and viewing of at least one advertising message.

56. The system of claim 5, wherein the plurality of inquiries compiled and merged comprises the retrieving and viewing of graphic data for at least one specific property over a specified period of time.

57. The system of claim 5, wherein the plurality of inquiries compiled and merged comprises the retrieving and viewing of text and/or graphic data for at least one specific property.

58. The system of claim 5, wherein the plurality of inquiries compiled and merged relate to industry-related goods or services.

59. The system of claim 5, wherein the end user comprises a financial institution.

60. The system of claim 5, wherein the end user comprises a governmental entity.

61. The system of claim 5, wherein one of said remote terminals comprises a financial institution's unit.

62. The system of claim 5, wherein one of said remote terminals comprises a governmental entity's unit.

63. The system of claim 5, wherein the plurality of end user inquiries compiled and merged comprise retrieving and viewing of a plurality of property profiles in a particular geographic region.

64. The system of claim 5, wherein the plurality of end user inquiries compiled and merged comprise retrieval and viewing of information relating to particular goods or services.

65. The system of claim 5, wherein the plurality of end user inquiries compiled and merged comprise retrieval and viewing of information relating to an end user order for particular goods or services.

66. The system of claim 5, wherein the demographic database comprises information on the number of end user inquiries in a particular geographic region, wherein the inquiries comprise retrieving and viewing at least one property profile.

67. The system of claim 5, wherein the demographic database comprises information on the number of end user inquiries in a particular geographic region, wherein the inquiries comprise retrieving and viewing at least one advertisement.

68. The system of claim 5, wherein the demographic database comprises information on the number of end user inquiries in a particular geographic region during a particular time period, wherein the inquiries comprise retrieving and viewing at least one property profile.

69. The system of claim 5, wherein the demographic database comprises information on the number of end user inquiries in a particular geographic region during a particular time period, wherein the inquiries comprise retrieving and viewing at least one advertisement.

70. The system of claim 5, wherein the demographic information is useable by a second end user for targeting advertising messages for particular goods or services.

71. The system of claim 5, wherein the demographic information is useable by a second end user for targeting advertising messages to end users accessing the text and/or graphic data from the database.

72. The system of claim 5, wherein the demographic information is useable by a second end user for determining advertising expenditures for particular goods or services.

73. The system of claim 5, wherein the plurality of end user inquiries compiled and merged comprise retrieving and viewing of a plurality of property profiles in a particular geographic region during a particular time period.

74. The system of claim 5, wherein the plurality of end user inquiries compiled and merged comprise retrieval and viewing of information relating to particular goods or services in a particular geographic region during a particular time period.

75. The system of claim 5, wherein the plurality of end user inquiries compiled and merged comprise retrieval and viewing of information relating to an end user order for particular goods or services in a particular geographic region during a particular time period.

\* \* \* \* \*